Sheet 2-2 Sheets.
A. Rank.
Mower.
N°61953 — Patented Feb. 12, 1867.
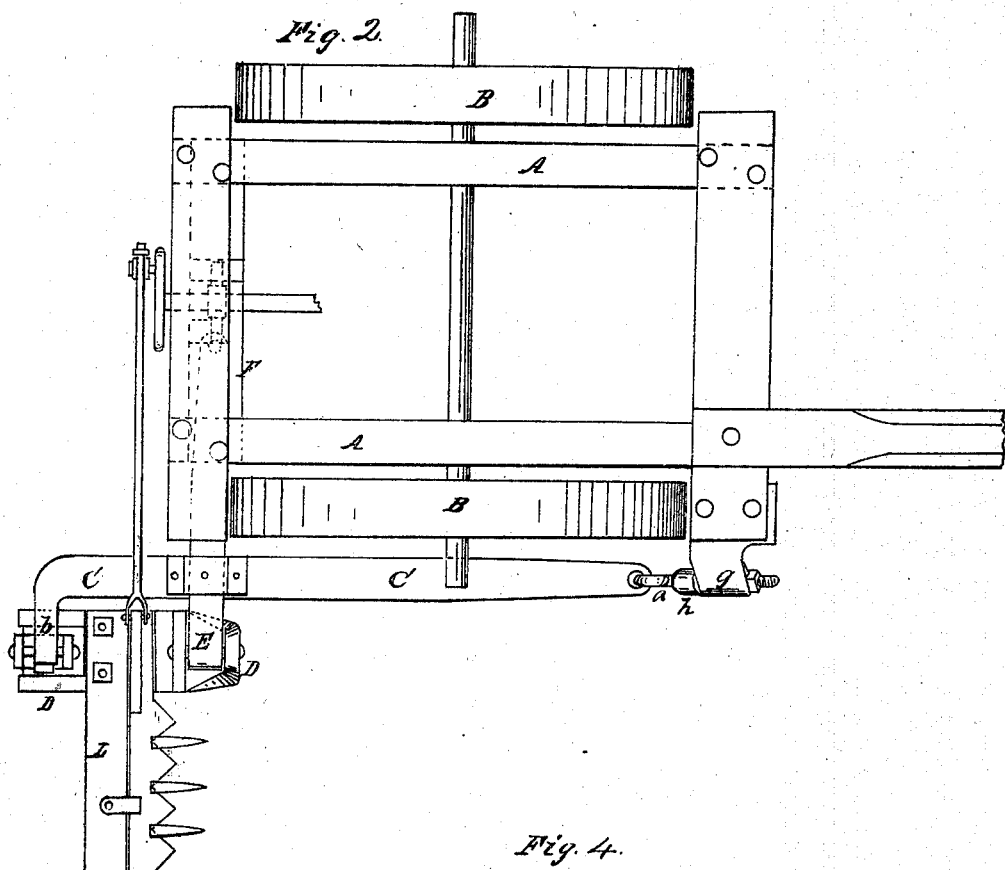
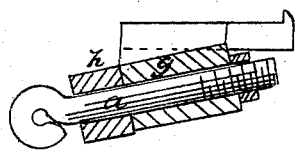
Witnesses
Henry Sylvester
Edw Schafer
Inventor
Amos Rank
by
Mason, Fenwick & Lawrence

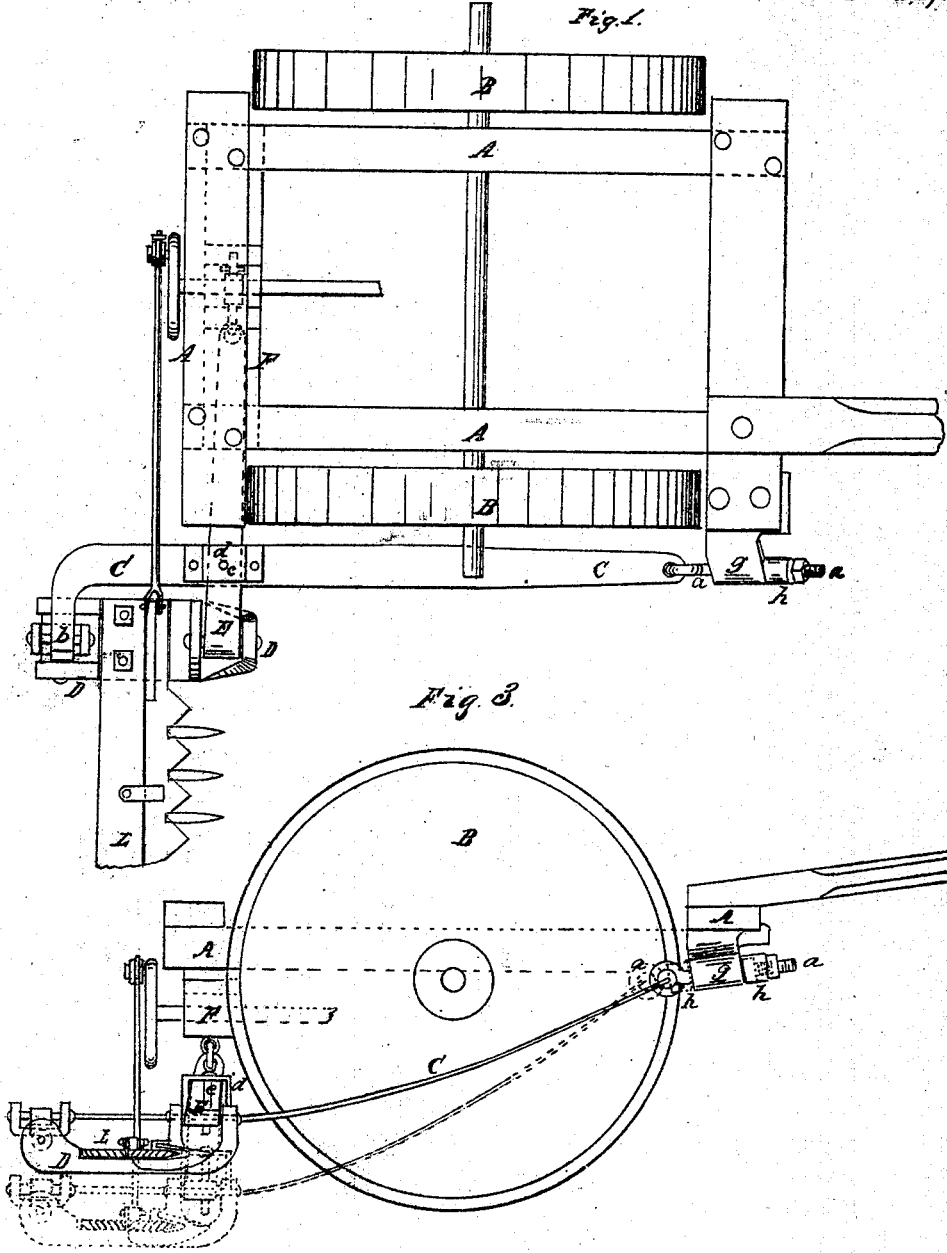

United States Patent Office.

AMOS RANK, OF SALEM, OHIO, ASSIGNOR TO ÆTNA MANUFACTURING COMPANY, OF SAME PLACE.

Letters Patent No. 61,953, dated February 12, 1867.

---

IMPROVEMENT IN HARVESTERS.

---

The Schedule referred to in these Letters Patent and making part of the same.

---

TO ALL WHOM IT MAY CONCERN:

Be it known that I, AMOS RANK, of Salem, in the county of Columbiana, and State of Ohio, have invented a new and useful Improvement in Reaping and Mowing Machines; and I do hereby declare that the following is a full, clear, and exact description thereof, reference being had to the accompanying drawings, making a part of this specification, in which—

Figure 1 is a plan view of the main portion of a harvesting machine, showing the finger-beam adjusted for reaping.

Figure 2 is a view of the same parts adjusted for mowing.

Figure 3 is a side elevation of fig. 1.

Figure 4 is a sectional view of the eye-bolt, to which the front end of the drag-bar is pivoted.

Similar letters of reference indicate corresponding parts in the several figures.

This invention relates to an improvement on that class of combined reaping and mowing machines in which the finger-bar is secured, at its inner end, to the rear end of a longitudinal drag-bar, which bar is pivoted at its front end to a swivel eye-bolt, so that it can vibrate freely and also rise and fall bodily. In this class of machines, as heretofore constructed, the sickle and pitman-rod bind and work hard, in consequence of being thrown out of a line with each other, when the finger is elevated from a position for cutting grass to a position for cutting grain.

To obviate this difficulty, which is found to be a serious one, the nature of my invention consists in the application to the swivel connecting-pin, at the forward end of the drag-bar, of an elongated collar or gauge, of such determined length that, when it is in place, establishes the proper set of the finger-beam with relation to the wrist-pin of the pitman crank, for either mowing or reaping, and admits of the adjustment of the finger-bar without measurement, and with unerring certainty, as will be hereafter described.

To enable others skilled in the art to understand my invention, I will describe its construction and operation.

In the accompanying drawings, A is the beam frame, B B the supporting wheels, and C the drag-bar, to the rear end of which the finger-beam L is suitably connected. The front end of this drag-bar C is pivoted to the rear end of a swivel-pin, $a$, which pin passes freely through a bearing, $g$, projecting from the main frame, and receives upon its front end a nut, as shown in the drawings. The pin $a$ should be made of such length as to receive between its eye and the rear end of its bearing, $g$, a gauge collar, $h$, when the finger-beam and cutting apparatus are depressed to a position for cutting grass, as shown in fig. 2, and indicated in fig. 3 in red lines. When the parts are in this position, the sickle and its pitman-rod are in the same vertical plane, and will work smoothly. When the finger-bar is raised for converting the machine into a reaper, the collar $h$ is removed from behind the bearing $g$ and placed on the pin $a$, in front of this bearing, as shown in figs. 1 and 3 in black lines. To apply the collar in front of the bearing $g$, it is necessary to move the drag-bar with its cutting apparatus forward the distance of the length of said collar, which will leave the sickle and pitman-rod still in the same vertical plane. In fig. 3 the elevated and depressed positions of the finger-bar are clearly shown, where it will be seen that the sickle and pitman-rod are in a straight line in both positions, and consequently there will be no binding of the joints or other parts.

I am aware that drag-bars have been adjusted by means of a nut and screw, but I am not aware that a gauge-collar, $h$, has ever been used in connection with such adjusting device, such collar being of such length that when it is in place establishes the proper place or set of the finger-beam and cutting apparatus for either mowing or reaping, according as the collar is applied on the adjusting-pin or swivel connection; and thus the most inexperienced hand is enabled, in a moment, to change the machine from a reaper to a mower, without moving the sickle and pitman-rod out of a straight line vertically.

What I claim as new, and desire to secure by Letters Patent, is—

Providing for keeping the sickle and pitman-rod, of a combined reaper and mower, in a straight line, vertically, by means of a gauge-collar, $h$, applied to the swivel-pin $a$, substantially as described.

AMOS RANK.

Witnesses:
PETER A. LAUBIE,
FRANK A. SHARPNACK.